Oct. 18, 1966     E. PARDUE     3,279,523
SPARE FUEL CONTAINER FOR VEHICLES
Filed April 6, 1964
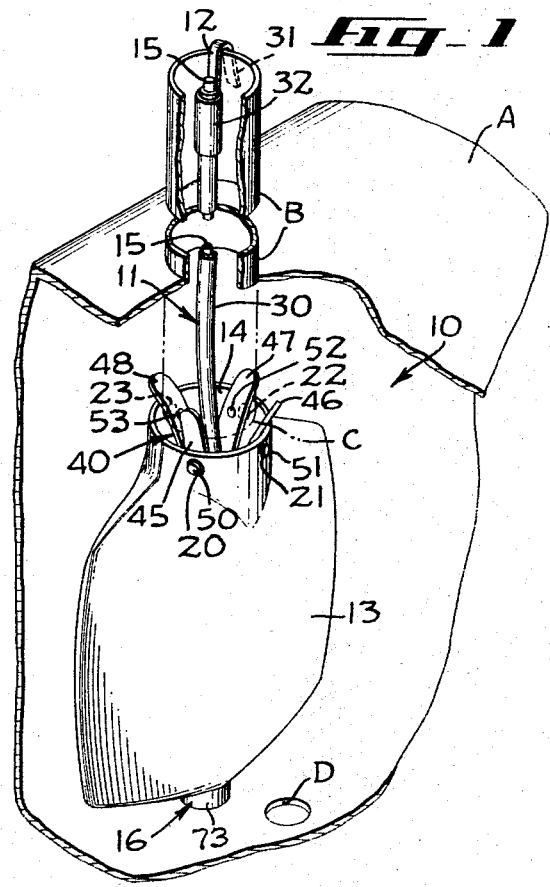
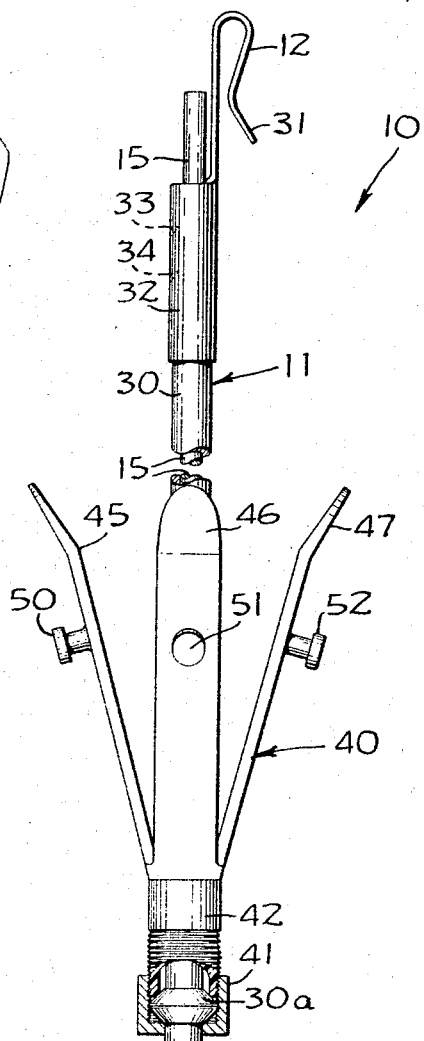
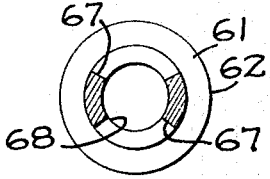
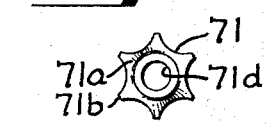
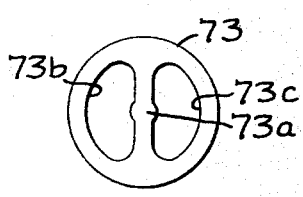
INVENTOR.
EDWARD PARDUE
BY
Jack M. ......
ATTORNEY

United States Patent Office 3,279,523
Patented Oct. 18, 1966

3,279,523
SPARE FUEL CONTAINER FOR VEHICLES
Edward Pardue, 375 El Camino Real, Atherton, Calif.
Filed Apr. 6, 1964, Ser. No. 357,697
8 Claims. (Cl. 158—46.5)

The present invention relates in general to fuel tanks for vehicles, and more particularly to an auxiliary fuel container for a fuel tank of a vehicle.

Many persons are often forgetful about replenishing the supply of fuel for a vehicle. Consequently, the supply of fuel may be exhausted at the most inopportune time. Such an event may not only be inconvenient, but at times may be hazardous.

An object of the present invention is to provide an improved auxiliary fuel container for a vehicle fuel tank.

Another object of the present invention is to provide an auxiliary fuel container in which a reserve supply of fuel is stored and wherein the reserve supply of fuel may be discharged into the fuel tank with facility and ease of operation.

Another object of the present invention is to provide an auxiliary fuel container in which a reserve supply of fuel is stored that is easily insertable into a fuel tank.

Another object of the present invention is to provide an auxiliary fuel container in which a reserve supply of fuel is stored that is easily insertable into a fuel tank, and yet has a sufficiently large, expandable inlet opening to receive a replenishing supply of fuel.

Other and further objects and advantages of the present invention will be apparent to one skilled in the art from the following description taken in conjunction with the accompanying drawings, in which:

FIG. 1 is a perspective view of the auxiliary fuel container of the present invention illustrated with a fragmentary view of a fuel tank.

FIG. 2 is a fragmentary vertical sectional view partially in elevation of the auxiliary fuel container taken along the axis of a discharge valve.

FIG. 3 is a horizontal section view taken along line 3—3 of FIG. 2.

FIG. 4 is a plan view of the discharge valve taken along line 4—4 of FIG. 2.

FIG. 5 is an end view of the discharge valve embodied in the auxiliary fuel container of the present invention.

Illustrated in FIG. 1 is a conventional fuel tank A for vehicles by way of example, automobiles, airplanes, boats or any conveyance employing fuel. Mounted on the fuel tank A in communication therewith is an intake tube B with a conventional reduced diameter flange C. A conventional discharge tube D is shown at the lower wall of the fuel tank A in communication therewith through which fuel is discharged from the tank A into the fuel line of an engine.

Initially, the auxiliary fuel container 10 of the present invention is wrapped or shaped into an elongated, relatively narrow configuration and inserted into the intake tube B of the tank A. Thereupon, the auxiliary container 10 is lowered into or positioned within the tank A (FIG. 1). The operator retains a hold on a flexible, discharge valve control line or cable 11 and places a clip 12 thereof on the rim of the inlet tube B.

After the auxiliary fuel container 10 is inserted into the fuel tank A, a flexible reservoir 13 thereof is raised until the mouth 14 thereof receives the discharge end of the inlet tube B. Now, the clip 12 is lowered to seat onto the rim of the inlet tube B and the line 11 has the surplus portion thereof cut-away or removed. At this time, fuel is poured into the reservoir 13 through the mouth 14 thereof from the inlet tube B. After the reservoir 13 is filled with a reserve supply of fuel, the fuel flowing through the inlet tube B will overflow into the tank A.

Should the operator desire to discharge the reserve supply of fuel from the reservoir 13 into the fuel tank A, a plunger 15 is actuated to open a discharge valve 16 at the lower end of the reservoir 13. The valve 16 is spring loaded so as to automatically close when the plunger 15 is released.

The reservoir 13 is made of suitable rubber, polyurethane or plastic material so as to be flexible, yieldable and withstand any corrosive action by the fuel stored therein or by the fuel stored in the tank A. In addition, the reservoir 13 has substantially rectangular confronting walls joined along adjacent edges so as to be easily wrapped up into an elongated, narrow shape to enable it to be inserted with facility into the tank A through the inlet tube B.

Formed in the upper section of the reservoir 13 is the mouth or the inlet opening 14, which has substantially a tubular-shaped neck. In the tubular-shaped neck are formed peripheral openings 20–23. Received by the mouth 14 is the discharge valve control line 11, which is disposed within the reservoir 13 and extends adjacent to the discharge valve 16. Also, the discharge valve control line 11 projects outwardly from the reservoir 13 through the mouth 14.

As shown in FIG. 2, the discharge valve control line 11 comprises a flexible, tubular sleeve 30, which extends substantially the entire length of the control line 11. The sleeve 30 may be made from suitable material, such as nylon, polypropylene or a suitable plastic. Disposed within the sleeve 30 for relatively free movement therewithin is the valve impelling rod or plunger 15. The plunger 15, which is made of nylon, polypropylene or a suitable plastic material, is flexible and, yet, sufficiently rigid to actuate the discharge valve 16. It is to be observed that the impelling rod 15 is longer in length than the sleeve 30 and thus projects above the sleeve 30 and also projects below the sleeve 30.

Mounted at the upper extremity of the sleeve 30 is the clip 12, which is slidable along the outer wall of the sleeve 30. At the free end of the clip 12 is a suitable hook 31 that is adaptable to engage the rim the inlet tube B to be retained thereon until released therefrom by an operator. The hook 31 projects from a cylindrical body 32 of the clip 12 that embraces the sleeve 30 to enable sliding movement of the clip 12 relative to the sleeve 30. Formed in the body 32 are indents 33 and 34 that enable the clip 12 to be moved only in the direction toward the reservoir 13. In this manner, the clip 12 can be adjustably positioned aolng the sleeve 30 to accommodate the distance of the rim of the inlet tube B from the reservoir 13. However, the clip 12 would be enabled to slip off the sleeve 30 or enable the reservoir 13 to extend beyond a desired distance within the tank A.

Midway between the ends of the sleeve 30 is located a flexible stay attachment 40, which is made of suitable material, such as polypropylene or plastic. The stay attachment 40 is fixedly secured to the sleeve 30. For this purpose, the sleeve 30 has an abutment metallic nut 41 fixedly secured thereto. The nut is internally threaded and is in threaded engagement with an integrally formed, tapered, annual projection 30a of the sleeve 30. The stay attachment 40 includes a cylindrical body 41 that is externally threaded and is fixedly secured to the nut 41 by threaded engagement therewith. Projecting from the cylindrical body 41 are upwardly and outwardly directed stays 45–48, which are flexible and yet sufficiently rigid to maintain the mouth 14 of the reservoir 13 fully open. At the free ends of the stays 45–48 are collar-button like projections 50–53, which are received by the openings or eyelets 20–23, respectively, of the reservoir 13 for locking engagement with the tubular wall of the reservoir 13 surrounding the mouth thereof.

By virtue of the foregoing arrangement, the mouth 14 of the reservoir 13 can be narrowed sufficiently by an operator when the reservoir 13 is inserted into the tank A through the intake tube B, yet, the mouth 14 will open automatically under the urgency or action of the flexible stays 45–48 so that the reservoir 13 can be filled with a reserve supply of fuel with facility and ease of operation and also to enable overflow fuel to flow unimpeded into the fuel tank A. It is recalled that when the reservoir 13 is filled, the mouth 14 thereof is disposed below the discharge end of the intake tube B. Under the foregoing arrangement, the diameter of the tubular wall surrounding the mouth 14 will be great enough, when expanded, to receive the discharge end of the inlet tube B and also to permit the overflow fuel to flow unimpeded into the fuel tank A.

At the lower end of the sleeve 30 and at the discharge end of the reservoir 13 is located the discharge valve 16. Formed in the lowermost portion of the reservoir 13 is an opening 60. Received by the opening 60 of the reservoir 13 is a cylindrical valve body 61 of the discharge valve 16. The valve body 61 includes a flange 62 that rests on the walls of the reservoir 13 surrounding the opening 60. At the lower end of the valve body 61 is an externally threaded wall 63 and at the upper end of the valve body 61 is an externally threaded wall 64.

The valve body 61 is fixedly secured to the lower end of the sleeve 30. For this purpose, the sleeve 30 has integrally formed therewith a tapered, annual projection 65. Seated on the conically shaped projection 65 is a metallic nut 66, which is in threaded engagement with the threaded wall 64 of the valve body 61. The valve body 61 includes a plurality of spaced peripherally formed openings 67 to provide passageways from the reservoir 13 in a cylindrical bore 68 of the valve body 61. Surrounding the bore 68 is an internally projecting flange that forms a valve seat 69. Disposed within an increased diameter bore 70 of the valve body 61 is a movable valve element 71 having a tapered wall 71a that moves into and out of engagement with the valve seat 69 to close and open the valve 16. The valve element 71 also includes a cylindrical body 71b. Centrally located within the body 71b is a cylindrical projection 71c for guiding a suitable coil spring 72 disposed within the valve element body 71b. Formed in the upper section of the valve element tapered wall 71a centrally thereof is a recess 71d for receiving the lowermost end of the impelling rod or plunger 15.

A cap 73 is in threaded engagement with the lower threaded wall 63 of the valve body 61. A post 73a projects upwardly to be received by the coil spring 72. In the lower wall of the cap 73 are suitable openings 73b and 73c communicating with the bore 70 of the valve body 63. All the elements of the discharge valve 16 are made from suitable material, such as polypyropylene or plastic, excepting the coil spring 72 and the nut 64, which are made from metal.

To discharge fuel stored within the reservoir 13, an operator actuates the plunger 15. Thereupon, the lowermost end of the plunger 15 engages the valve element 71 within the recess 71d, thereby impelling the valve element 71 against the action of the spring 72 to remove the valve element 71 from engagement with the valve seat 69. As a consequence thereof, the fuel stored in the reservoir 13 is discharged therefrom into the tank A over the following path: reservoir 13, openings 67, valve bore 68, valve bore 70 and openings 73b and 73c. When the operator releases the plunger 15, the valve element 71 is returned automatically in sealing engagement with the valve seat 69 under the urgency of the coil spring 72.

In the operation of the auxiliary fuel container 10, an operator wraps or shapes the container including the mouth 14 into an elongated, narrow configuration to insert the same into the fuel tank A through the inlet tube B. In so doing, the operator retains a hold of the valve control line 11 and places the hook 12 thereon onto the flange C of the inlet tube B to be retained thereby. A cap, not shown, for the fuel tank A may be inserted over the inlet tube B without any interference from the clip 12.

At a suitable facility, the operator removes the fuel tank cap from the tube B. The mouth 14 of the reservoir 13 has received the discharge end of the inlet tube B. Under the resilient action of the stays 45–48, the mouth 14 of the reservoir 13 is automatically expanded to accommodate the discharge end of the inlet tube B and also to permit overflow fuel to flow into the tank A unimpeded. Fuel pouring into the inlet tube B fills the reservoir 13 through the mouth 14 to store a supply of fuel within the reservoir 13 and the overflow fuel fills the tank A. The fuel tank cap, not shown, is once again inserted onto the inlet tube B.

Should it be necessary to discharge the fuel storage in the reservoir 13 into the fuel tank A, the operator removes the fuel tank cap from the inlet tube B. Thereupon, the operator actuates the plunger 15 causing the lowermost end thereof to engage the valve element 71. This action impels the valve element 71 against the urgency of the coil spring 72 for moving the valve element 71 away from the valve seat 69. This results in the fuel stored in the reservoir 13 to be discharged into the fuel tank A through the discharge valve 16. When the operator releases the plunger 15, the valve element 71 is returned automatically into sealing engagement with the valve seat 69 under the urgency of the coil spring 72. The fuel tank cap is returned for seating on the inlet tube B.

It is to be understood that modifications and variations of the invention disclosed herein may be resorted to without departing from the spirit of the invention and the scope of the appended claims.

Having thus described my invention, what I claim as new and desire to protect by Letters Patent is:

1. An auxiliary fuel container for storing fuel for a vehicle comprising a reservoir having an upper opening at one end thereof and a discharge opening at another end thereof, a discharge valve disposed within said discharge opening of said reservoir for controlling the discharge of fuel from said reservoir, a tubular member disposed within said reservoir, means for supporting said tubular member within said reservoir, and a plunger received by said tubular member for movement relative thereto, said plunger being formed with one end thereof projecting out of said reservoir through said upper opening thereof and with another end thereof adjacent said discharge valve for activating said discharge valve to control the discharge of fuel from said reservoir through said discharge valve.

2. An auxiliary fuel container for storing fuel for a vehicle comprising a reservoir having an upper opening at one end thereof and a discharge opening at another end thereof, a discharge valve disposed within said discharge opening of said reservoir for controlling the discharge of fuel from said reservoir, a flexible tubular member disposed within said reservoir, means for supporting said tubular member within said reservoir, and a flexible plunger received by said tubular member for movement relative thereto, said plunger being formed with one end thereof projecting out of said reservoir through said upper opening thereof with another end thereof adjacent said discharge valve for activating said discharge valve to control the discharge of fuel from said reservoir through said discharge valve.

3. An auxiliary fuel container for storing fuel for a vehicle comprising a reservoir having an upper opening at one end thereof and a discharge opening at another end thereof, a discharge valve disposed within said discharge opening of said reservoir for controlling the discharge of fuel from said reservoir, a flexible tubular member disposed within said reservoir, means for supporting said tubular member within said reservoir, a flexible plunger received by said tubular member for movement relative thereto, said plunger being formed with one end thereof projecting out of said reservoir through said upper opening thereof with another end thereof adjacent said discharge valve for activating said discharge valve to control the discharge of fuel from said reservoir through said discharge valve, and a clip mounted on said flexible tubular member adjacent said one end of said flexible plunger and adapted to engage a portion of a fuel tank to be retained thereby.

4. An auxiliary fuel container for storing fuel for a vehicle comprising a reservoir having an upper opening at one end thereof and a discharge opening at the opposite end thereof, a discharge valve disposed within said discharge opening of said reservoir for controlling the discharge of fuel from said reservoir, a spring for urging said discharge valve in a closed position, and plunger means supported within said reservoir with one end projecting out of said reservoir through said upper opening and with another end thereof adjacent said discharge valve for activating said discharge valve to open said discharge valve against the urgency of said spring to discharge fuel from said reservoir through said discharge valve, the release of said plunger automatically closes said valve under the action of said spring.

5. An auxiliary fuel container for storing fuel from a vehicle comprising a reservoir having an upper opening at one end and a discharge opening at the opposite end thereof, a valve body disposed within said discharge opening having a bore communicating with said reservoir and a valve seat surrounding said bore, a valve element engageable with said valve seat, a spring urging said valve element into sealing engagement with said valve seat, means carried by said valve body for supporting said spring, and plunger means supported within said reservoir with one end projecting out of said reservoir through said upper opening and with another end received by said bore for disengaging said valve element from said valve seat against the urgency of said spring to discharge fuel from said reservoir through said valve body.

6. An auxiliary fuel container for storing fuel for a vehicle comprising a flexible reservoir with a mouth at the inlet end thereof, said reservoir being formed with a flexible wall surrounding said mouth, a plurality of flexible stays disposed within said reservoir in continuous engagement with said wall for continuously urging said wall outwardly to maintain said mouth in an extended condition, means interconnecting said stays with said wall for attachment to said wall, and means disposed within said reservoir for joining said stays.

7. An auxiliary fuel container for storing fuel for a vehicle comprising a flexible reservoir with a mouth at one end thereof and a discharge opening at the opposite end thereof, said reservoir being formed with a flexible wall surrounding said mouth, a plurality of flexible stays disposed within said reservoir in continuous engagement with said wall for continuously urging said wall outwardly to maintain said mouth in an extended condition, means interconnecting said stays with said wall for attachment to said wall, a discharge valve disposed within said discharge opening of said reservoir for controlling the discharge of fuel from said reservoir, a flexible tubular member disposed within said reservoir, means attached to said tubular member and joined to said stays, and a flexible plunger received by said tubular member for movement relative thereto, said plunger being formed with one end thereof projecting out of said reservoir through said mouth and with another end thereof adjacent said discharge valve for activating said discharge valve to control the discharge of fuel from said reservoir through said discharge valve.

8. An auxiliary fuel container for storing fuel for a vehicle comprising a flexible reservoir with a mouth at one end thereof and a discharge opening at the opposite end thereof, said reservoir being formed with a flexible wall surrounding said mouth, a plurality of flexible stays disposed within said reservoir in continuous engagement with said wall for continuously urging said wall outwardly to maintain said mouth in an extended condition, means interconnecting said stays with said wall for attachment to said wall, a valve body disposed within said discharge opening having a bore communicating with said reservoir and a valve seat surrounding said bore, a valve element engageable with said valve seat, a spring urging said valve element into sealing engagement with said valve seat, a flexible tubular member disposed within said reservoir, means attached to said tubular member and joined to said stays, and a flexible plunger received by said tubular member for movement relative thereto, said plunger being formed with one end thereof projecting out of said reservoir through said mouth and with another end thereof received by said bore for disengaging said valve element from said valve seat against the urgency of said spring to discharge fuel from said reservoir through said valve body.

References Cited by the Examiner
UNITED STATES PATENTS

| | | | |
|---|---|---|---|
| 1,220,929 | 3/1917 | Baltzley | 222—510 |
| 2,189,238 | 2/1940 | Benjamin | 141—363 X |
| 2,644,514 | 7/1953 | Potter | 158—46.5 |
| 2,758,764 | 8/1956 | Piazze | 141—312 X |
| 2,901,875 | 9/1959 | Hultkrans et al. | 141—312 X |

LAVERNE D. GEIGER, *Primary Examiner.*

H. BELL, *Assistant Examiner.*